US009804038B2

(12) United States Patent
Hasegawa et al.

(10) Patent No.: US 9,804,038 B2
(45) Date of Patent: Oct. 31, 2017

(54) POWER DAMPER, LASER POWER METER, LASER POWER MEASUREMENT METHOD, AND LASER POWER MONITORING SYSTEM

(71) Applicant: MITSUBISHI ELECTRIC CORPORATION, Chiyoda-ku (JP)

(72) Inventors: Masahiko Hasegawa, Chiyoda-ku (JP); Yasunari Matsumoto, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 371 days.

(21) Appl. No.: 14/421,554

(22) PCT Filed: Sep. 25, 2013

(86) PCT No.: PCT/JP2013/075850
§ 371 (c)(1),
(2) Date: Feb. 13, 2015

(87) PCT Pub. No.: WO2014/050859
PCT Pub. Date: Apr. 3, 2014

(65) Prior Publication Data
US 2015/0185091 A1 Jul. 2, 2015

(30) Foreign Application Priority Data

Sep. 27, 2012 (JP) ................................. 2012-213452

(51) Int. Cl.
*G01K 17/00* (2006.01)
*H01S 3/00* (2006.01)
(Continued)

(52) U.S. Cl.
CPC .......... *G01K 17/003* (2013.01); *B23K 26/032* (2013.01); *B23K 26/21* (2015.10);
(Continued)

(58) Field of Classification Search
CPC ..................................................... G01K 17/003
(Continued)

(56) References Cited

U.S. PATENT DOCUMENTS 3,123,996 A * 3/1964 Musial .................. G01K 17/00
374/29
5,112,134 A * 5/1992 Chow .................. G01N 27/305
356/427

(Continued)

FOREIGN PATENT DOCUMENTS

| JP | S50-086385 A | 7/1975 |
| JP | 53-100879 A | 9/1978 |
| JP | 57-19432 U | 2/1982 |
| JP | 2002-214037 A | 7/2002 |

OTHER PUBLICATIONS

International Search Report (PCT/ISA/210) dated Jan. 14, 2014, by the Japanese Patent Office as the International Searching Authority for International Application No. PCT/JP2013/075850.
(Continued)

*Primary Examiner* — Minh Phan
*Assistant Examiner* — Leon W Rhodes, Jr.
(74) *Attorney, Agent, or Firm* — Buchanan Ingersoll & Rooney PC

(57) ABSTRACT

A laser power meter according to the invention is configured to have a power damper including a laser receiving body that receives a laser beam on an inner surface thereof and converts laser power into heat, a case that forms a channel between the case and an outer surface of the laser receiving body, a heat insulation member between the laser receiving body and the case, and temperature measurement means for measuring a heat quantity absorbed by the laser receiving body; and conversion means for converting a signal of the temperature measurement means into an output value for a laser beam.

9 Claims, 5 Drawing Sheets

(51) Int. Cl.
    *B23K 26/03*     (2006.01)
    *B23K 26/38*     (2014.01)
    *G01J 5/00*     (2006.01)
    *G01J 5/10*     (2006.01)
    *B23K 26/70*     (2014.01)
    *B23K 26/21*     (2014.01)

(52) U.S. Cl.
    CPC ............ *B23K 26/38* (2013.01); *B23K 26/704* (2015.10); *G01J 5/0037* (2013.01); *G01J 5/10* (2013.01); *H01S 3/005* (2013.01)

(58) Field of Classification Search
    USPC ............................................................ 374/32
    See application file for complete search history.

(56) References Cited

U.S. PATENT DOCUMENTS

| | | | | |
|---|---|---|---|---|
| 5,743,641 A * | 4/1998 | Geiger | ................ | G01K 17/003 374/179 |
| 7,125,163 B2 * | 10/2006 | Eigler | ................... | G01K 17/00 374/1 |
| 8,295,316 B2 * | 10/2012 | Akins | ................ | G03F 7/70025 372/29.014 |

OTHER PUBLICATIONS

Office Action (Reason) dated Jul. 28, 2015, by the Japanese Patent Office in corresponding Japanese Patent Application No. 2014-538515, and an English Translation of the Office Action. (12 pages).

\* cited by examiner

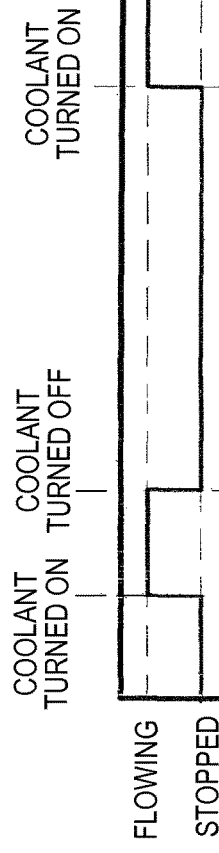
FIG.3A FLOWING STATE OF POWER DAMPER COOLANT
FIG.3B LASER OSCILLATION
FIG.3C TEMPERATURE OF POWER DAMPER

POWER DAMPER, LASER POWER METER, LASER POWER MEASUREMENT METHOD, AND LASER POWER MONITORING SYSTEM

TECHNICAL FIELD

The present invention relates to a power damper for a high-power laser used in cutting and welding, a laser power meter, a laser power measurement method, and a laser power monitoring system.

BACKGROUND ART

Recently, in accordance with advances in laser oscillators and the like, a high-power laser is applied to mass production lines such as in cutting and welding of metal. Processing quality of laser processing is greatly influenced by processing parameters such as laser power, laser power density distribution (mode), and processing assist gas. Particularly, appropriate setting of the laser power is an indispensable element in order to obtain favorable processing quality, and thus, a laser power meter having high accuracy is essential.

Generally, a laser power meter of the kW class performs measurement by extracting a portion of a laser beam using attenuation means for attenuating intensity of a laser beam (a partial transmission mirror and the like). However, in this case, since the attenuation means and an optical sensor receiving high power are thermally deteriorated, correction or replacement is necessary substantially every year. This method is often used as a monitor for power in the laser oscillator to control power feedback.

Normally, in order to properly measure laser power, a laser receiving body is irradiated with all the laser beams, the laser beams are converted into heat, and the heat quantity thereof is measured. However, in this method, it takes time for stabilizing the temperatures of the laser receiving body and a coolant. In addition, the measurement cannot be performed when a laser is in use, and thus, this method cannot be used to control the feedback.

A laser receiving unit of the laser power meter disclosed in PTL 1 is formed to have a laser receiving body, a casing, and a cooling channel provided at a position between both thereof. The coolant is supplied to the cooling channel from a water supply apparatus via a pipe. A measurement unit of the laser power meter is configured to include a water meter of the coolant on an entrance side, a water temperature meter such as a thermocouple, and another water temperature meter on an exit side. Using a flow rate Q of the coolant, a water temperature Ti on the entrance side, and another water temperature To on the exit side measured by these instruments, the heat quantity transmitted from a laser receiving portion to the coolant is calculated, thereby obtaining a laser power value. Such a water cooling power damper-type laser power meter can measure power even in a high-power laser up to several tens of kW, thereby being widely used as a power meter of a carbon dioxide laser.

CITATION LIST

Patent Literature

PTL 1: JP-A-2002-214037

SUMMARY OF INVENTION

Technical Problem

However, in the power damper-type power meter disclosed in PTL 1, there is a need to measure the water temperature at two places and to measure the flow rate at one place, thereby requiring three sensors in total, resulting in a problem of a high cost of a system. In addition, in respect of a coolant, due to a rotational frequency of a pump motor, and the number of fins and valves, the flow rate thereof fluctuates. Meanwhile, when reflecting the variation of the flow rate in a temperature difference, there is an occurrence of a time lag required for heat conduction. Accordingly, on account of the fluctuation of the flow rate, there is an occurrence of an error in measurement of the temperature difference. The invention has been made taking the aforementioned points into consideration, and aims to provide a configuration at low cost and to realize laser power measurement having high measurement accuracy.

Solution to Problem

A power damper according to the invention includes a laser receiving body that receives a laser beam from a laser oscillator on an inner surface thereof and converts laser power into heat, a case that is attached to the laser receiving body so as to surround an outer surface of the laser receiving body and forms a channel of a coolant between the case and the outer surface of the laser receiving body, an inflow hole and an outflow hole respectively leading to and from the channel provided in the case, a heat insulation member that thermally isolates the laser receiving body and the case from each other in an attachment portion of the laser receiving body and the case, and temperature measurement means for measuring a temperature of the laser receiving body. Particularly, the attachment portion of the laser receiving body and the case including the heat insulation member is provided at a position which is not generally used.

A laser power meter according to the invention has conversion means for converting a signal detected by the temperature measurement means included in the power damper into laser power.

A laser power measurement method according to the invention adopts the power damper and includes a first step of blocking circulation of a coolant into the power damper; a second step of oscillating a laser for a certain period; a third step of measuring the maximum variation value of an output signal of the temperature measurement means for the laser receiving body; a fourth step of calculating a laser power value based on the maximum variation value, a heat capacity of the power damper, and laser oscillation time, using the conversion means; and a fifth step of outputting or displaying the laser power value.

A laser power monitoring system according to the invention adopts the laser power meter and includes control means for automatically measuring laser power while power of the laser oscillator is turned on and during a period when no laser oscillation is necessary, storage means for laser power, means for calculating a chronological variation of laser power, means for selecting a maintenance item of the laser oscillator referring to the variation of laser power, means for notifying a maintenance component based on the maintenance item, and means for notifying maintenance time referring to the maintenance item.

Advantageous Effects of Invention

According to a power damper of the invention, by arranging a heat insulation member and causing a path through which heat is transmitted from the laser receiving body to be only the contact surface which comes into contact with the coolant, the heat quantity obtained by a laser receiving body can be measured with only the temperature of the laser receiving body. Accordingly, by using only one item of temperature measurement means, laser power can be measured at low cost. In addition, since there is no heat loss with respect to a case and the like, laser power can be accurately measured.

According to a laser power meter of the invention, by only adding conversion means for converting a temperature variation of the power damper into laser power, the power can be measured by using the power damper, and thus, the laser power meter can be configured at low cost. In addition, when adjusting a resonator mirror, absolute power requiring no attenuation means can be used. In other words, since real-time adjustment can be performed using the absolute power, proper adjustment can be performed. Moreover, "an integrating sphere-type power meter using a laser beam penetrating a partial transmission mirror" which is used in a laser power monitor can be corrected.

According to a laser power measurement method of the invention, by controlling irradiation time, a surface of the laser receiving body of the power damper is prevented from being damaged. By restricting the coolant, the contact surface of the laser receiving body and the coolant can be in a heat-insulated state, and a heat capacity which is the sum of the laser receiving body and the coolant can be reduced, thereby making it possible to increase an amount of the temperature variation of the laser receiving body. In other words, since intensity of a signal is significant, average power during an irradiation period can be accurately measured.

According to a laser power monitoring system of the invention, items, components, and time for maintenance are predictable, and thus, component-supplying manufacturers can produce and supply the components when needed. Accordingly, production planning can be easily established, and there is no occurrence of surplus stock. In addition, since a user of an oscillator can check the maintenance time, an operation plan of the oscillator is established so that the laser oscillator can be effectively used. Since there is no occurrence of a standby for delivery of the maintenance components, a practical operation rate of the oscillator is thereby improved.

BRIEF DESCRIPTION OF DRAWINGS

FIGS. 3A, 3B and 3C are time charts illustrating a signal change of the laser power measurement method of the invention.

DESCRIPTION OF EMBODIMENTS

Embodiment 1

Embodiments of the invention will be described with reference to the drawings. Initially, configurations of a power damper, a laser power meter, and a laser power monitoring system of the invention will be described in order.

[Power Damper]

Figure 1:
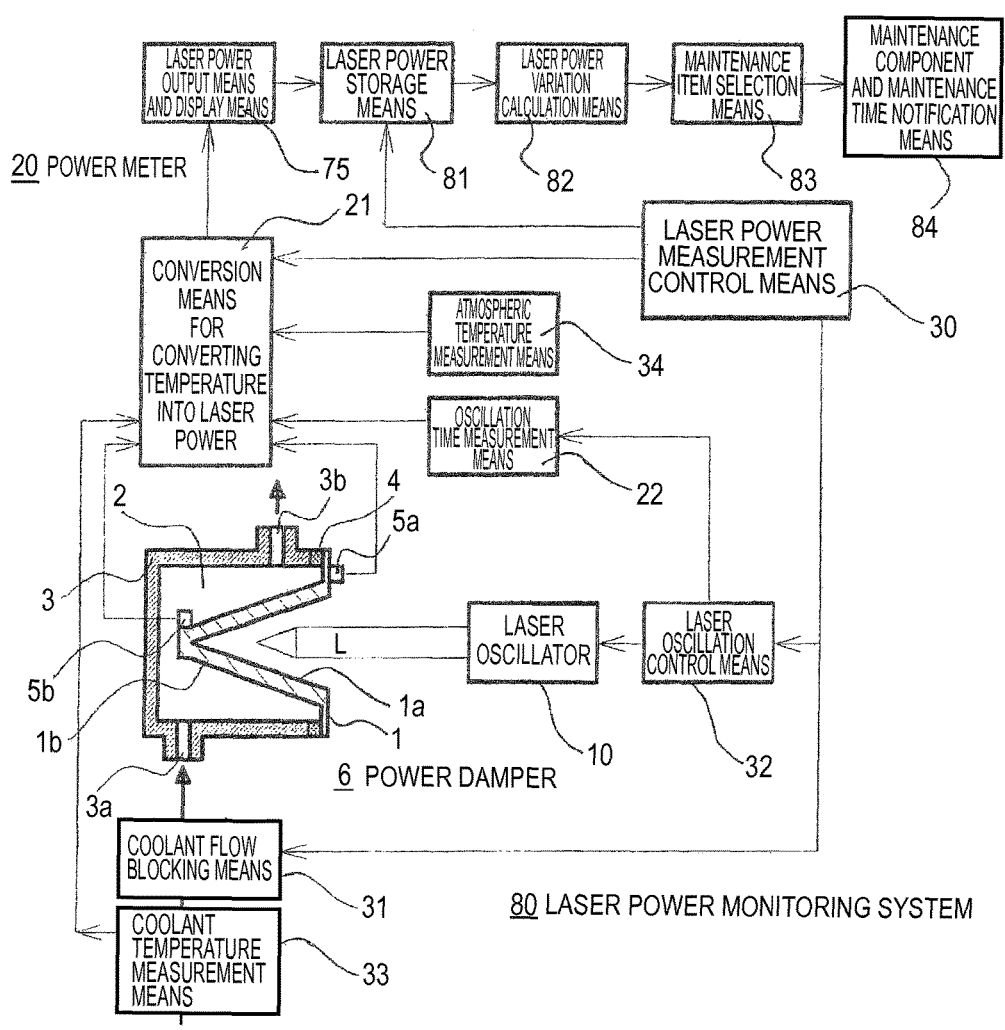
FIG. 1 illustrates a schematic diagram of a power damper according to Embodiment 1 of the invention, a configuration diagram of a laser power meter adopting the power damper, and a configuration diagram of a laser power monitoring system adopting the laser power meter.

In FIG. 1, a power damper 6 includes a cone-shaped laser receiving body 1 that absorbs a laser beam L emitted from a laser oscillator 10, on an inner surface 1a thereof, and a case 3 that accommodates the laser receiving body 1. Surroundings of an opening side of the laser receiving body 1 is attached to an opening side of the case 3 via a heat insulation member 4, and thus, the laser receiving body 1 and the case 3 are thermally isolated from each other. An inflow hole 3a through which a coolant is put in and an outflow hole 3b through which a coolant is drawn out are provided in the case 3. An outer surface 1b of the laser receiving body 1 and an inner side of the case 3 form a channel 2. Temperature measurement means 5b is attached to an outer surface 1b of the laser receiving body 1, and temperature measurement means 5a is attached to the vicinity of a joining portion of the case 3, on a side of an inner surface 1a of the laser receiving body 1, respectively. As the temperature measurement means 5a and 5b (both may be collectively and simply referred to as temperature measurement means 5), a thermocouple, a temperature resistor, a temperature sensor IC, and the like which are inexpensive and have favorable accuracy are used. In addition, the heat insulation member 4 has thermal conductivity lower than that of the laser receiving body 1 by the extent equal to or more than one order of magnitude. Specifically, the heat insulation member 4 is rubber, a resin, ceramic, brick, and the like. When selecting the heat insulation member 4, it is desirable to use a material having thermal conductivity equal to or lower than 10 W/m/C (1/10 of iron), and if possible, equal to or lower than 1 W/m/C (1/100 of iron, rubber corresponds thereto) in respect of an insulation effect thereof. Heat resistance of the heat insulation member 4 may be determined in accordance with a flash temperature of the laser receiving body 1. When a measurement procedure is set to cause the flash temperature to be approximately 100 C, rubber is one of the heat insulation members which can be implemented at low cost.

It is desirable to perform surface treatment on the inner surface 1a which is a laser receiving surface of the laser receiving body 1 in order to enhance absorptivity of the laser beam. For example, as the laser beam L, when using an IR wavelength such as from a $CO_2$ laser having approximately 10 m, absorptivity of a laser beam equal to or greater than 99% is realized by performing alumite surface treatment. In addition, in order to prevent heat strain damage due to heat absorption, for the purpose of lowering energy density of the surface, the shape thereof is designed so as to cause the laser beam L to be obliquely incident. For that purpose, in FIG. 1, the laser receiving body 1 has a conical inner surface shape.

[Laser Power Meter]

Subsequently, a configuration of a laser power meter will be described.

A laser power meter 20 is configured to include the power damper 6 and conversion means 21. The conversion means 21 acquires a laser power value based on signals (temperature measurement values) of the temperature measurement means 5a and 5b, and a heat capacity of the power damper 6 (the laser receiving body 1). Specifically, the conversion means 21 is a combination of an arithmetic circuit such as an amplifier, a scaling meter, and an operational amplifier; an A/D converter; and the like.

[Laser Power Monitoring System]

Subsequently, a laser power monitoring system adopting the power damper 6 and the laser power meter 20 will be described.

Control means 30 for measurement of laser power configuring a laser power monitoring system 80 includes NC, a sequencer, a personal computer, and the like. Flow blocking means 31 for opening and closing a flow of the coolant of the channel 2 by controlling the control means 30 is generally configured to have a switch of a coolant pump or a solenoid valve for water use. Laser oscillation control means 32 for controlling a laser oscillation of the laser oscillator 10 turns a laser oscillation ON or OFF, and increases or decreases intensity of the laser beam L by a command of the control means 30. As coolant temperature measurement means 33 and atmospheric temperature measurement means 34 for measuring an atmospheric temperature of the surroundings of the power damper 6, similar to the temperature measurement means 5 (5a and 5b), a thermocouple, a temperature resistor, a temperature sensor IC, and the like are used. However, the temperature measurement means 5 for the power damper 6, the coolant temperature measurement means 33, and the atmospheric temperature measurement means 34 desirably adopt the types of measurement means identical to each other, in respect of signal processing.

The conversion means 21 in the laser power monitoring system 80 adopts an output signal (a water temperature measurement value) of the coolant temperature measurement means 33 of the power damper 6, and an output signal (an atmospheric temperature measurement value) of the atmospheric temperature measurement means 34, thereby correcting the laser power value. Output and display means 75 for outputting and displaying the laser power value of the conversion means 21 has an outputting method such as voltage outputting through a voltage amplification circuit or digital outputting through A/D conversion, and performs display by using an inexpensive pointer meter or a digital meter. Storage means 81 for storing a signal of the laser power output and display means 75, that is, the laser power value is generally a memory of NC or a personal computer. However, printed material like a bar code, and additionally a handwritten numeric table and a computer-scored answer sheet may be adopted. When a set value to be measured for the laser power is not the same every time, the set value is also stored.

Laser power value variation calculation means 82 stored in the storage means 81 reads out a plurality of the stored laser power values and calculates a difference of the power values. The reading out is performed corresponding to the storage means 81, by an access circuit to a memory, a bar code reader, an optical reading device, and the like. Selection means 83 for determining a maintenance item compares a signal (a variation of the laser power value) of the calculation means 82 and a database (a group of result data of the power variation and the maintenance item) inside thereof, and determines the maintenance item of an oscillator, thereby performing the selection including not only one variation but also the variation history. Notification means 84 from notifying a maintenance component and maintenance time upon the reception of an output of the selection means 83 is included. The notification is displayed on an NC screen, a display terminal of a sequencer, a screen of a personal computer, and the like, or is printed out. Moreover, a management department of the oscillator, a maintenance component supplying manufacturer of the oscillator, and the like may be notified thereof through a LAN or the internet line.

[Operation of Power Damper]

Subsequently, an operation of the power damper 6 will be described.

The laser beam L emitted from the laser oscillator 10 is absorbed into the inner surface 1a of the laser receiving body 1, thereby being converted into heat. The heat is immediately transmitted to the inside of the laser receiving body 1, and the transmission thereof is cut by the heat insulation member 4 at the joining portion of the case 3. In the technology in the related art, in order to transmit heat to the coolant in a faster manner, the laser receiving body 1 and the case 3 are directly joined to each other. Since the heat insulation member 4 is not attached to the joining portion of the case 3, heat of the laser receiving body 1 is also transmitted to the case 3. Thus, a contact area in which the coolant absorbs heat is relatively increased, thereby making it possible to transmit heat to the coolant in a faster manner. Accordingly, a temperature increase of the laser receiving body 1 is slowed. However, since the invention exhibits an effect described later, the heat insulation member 4 is attached to the joining portion of the case 3. Meanwhile, heat conducted to the outer surface 1b of the laser receiving body 1 is transmitted to the coolant in the channel 2. The coolant in the channel 2 flows in through the inflow hole 3a and flows out through the outflow hole 3b without interruption. In other words, laser power transmitted to the coolant is discharged from the power damper 6 by the coolant. In this case, even though it is relatively a slight quantity, there is heat transmitted to the air from the surface of the inner surface 1a. If the heat insulation member 4 is not provided, there may be heat transmitted to the air from the surface of the case 3. However, there is no such heat transmission in the invention.

On account of such a heat transmission path, the temperature of the laser receiving body 1 becomes a temperature in which heat input from the laser beam L and heat transmitted to the coolant balance each other out. Meanwhile, the temperature of the coolant is equivalent to the temperature before the laser oscillation, that is, the temperature of the laser receiving body before the laser receiving body 1 receives a laser. Accordingly, when the temperatures of the laser receiving body 1 before and after a laser is oscillated are measured by the temperature measurement means 5a and 5b, using the following factors such as, (a) a geometric value calculated based on design such as a contact area S of the laser receiving body 1 and the channel 2, and (b) a heat transmission rate of the outer surface 1b of the laser receiving body 1 at a flow velocity which is measured in advance, the laser power (the quantity of input heat) is obtained by following Expression 1.

$$\text{laser power} = \text{heat transmission rate} * \text{contact area} * (\text{"temperature after oscillation"} - \text{"temperature before oscillation(cooled water temperature)"}) \quad \text{[Expression 1]}$$

Practically, the heat transmission rate requires a correction coefficient for each laser receiving body.

The temperature measurement means 5b is attached on the outer surface 1b which is the rear side of the laser receiving body 1 of the laser beam L. Since this position is highly influenced by the intensity of the laser beam L, the measurement can be performed more accurately. However, when there is a position change in irradiation of the laser beam L, the temperature measurement means 5b will be influenced by the position change. In addition, since the installation is performed in the channel 2, there is a need to study water tightness for drawing out of a signal. The temperature measurement means 5a is attached to the inner surface 1a of the laser receiving body 1 in the vicinity of the heat insulation member 4. Since this position is far away from the irradiation surface, the temperature measurement means 5a can be installed on the inner surface 1a, and there is no need to study the water tightness for drawing out of a signal, thereby allowing for simple wiring. In addition, the temperature measurement means 5a is less likely to be influenced with respect to the position change of the laser beam. Meanwhile, there is an occurrence of a time lag of heat conduction with respect to the intensity change.

In this manner, in the power damper 6 of the invention, the heat transmission between the laser receiving body 1 and the case 3 is blocked by the heat insulation member 4 so that the heat transmission is performed on only the contact surface which comes into contact with the channel 2. Thus, laser power can be measured by only measuring the temperature of the laser receiving body 1 using the temperature measurement means 5.

In addition, when adjusting a general resonator mirror, due to high laser power thereof, an operation is performed while monitoring the laser power by causing a laser beam emitted from the oscillator to be incident on the power meter via the attenuation means. In this case, there are disadvantages in that a dangerous laser beam is emitted from the oscillator during the operation, and the attenuation means and the power meter are required for power monitoring.

However, when the invention is adopted in adjusting the resonator mirror, the laser power can be measured by the power damper, and thus, it is possible to adjust without emitting a laser from the oscillator. Since the possibility of being exposed to the dangerous laser beam is eliminated, the adjustment operation can be safely performed. In addition, without requiring the attenuation means and the like, the adjustment operation can be simply performed. Moreover, since the adjustment can be performed using absolute power without involving the attenuation means, the adjustment can be properly performed. Furthermore, "an integrating sphere-type power meter using a laser beam penetrating a partial transmission mirror" which is built in a general laser oscillator and is used in a feedback control of the laser power can be corrected.

[Operation of Laser Power Meter and Laser Power Measurement Method]

Subsequently, an operation of the laser power meter 20 and a laser power measurement method adopting the power damper 6 will be described.

The laser power meter 20 can be realized by only adding the conversion means 21 for converting the temperature into laser power to the power damper 6. As a specific example, an operation of the laser power measurement by the conversion means 21 adopting Expression 1 will be described.

Initially, the contact area S of the laser receiving body 1 and the channel 2 is obtained. The contact area S can be simply obtained through geometric calculation from a component diagram of the laser receiving body 1, not through measurement. Subsequently, a heat transmission rate k on the surface thereof is obtained as a function of a temperature T. The heat transmission rate k is a substantially linear function in a range of a general coolant temperature and a contact surface temperature (a range of 0 C to 50 C). Although there is a significant difference between laminar flow and turbulent flow, there is no change between those two within a range of a flow change of a general cooling pump. Therefore, a conversion coefficient h (T) is obtained as follows.

$$h(T)=k(T)*S \qquad \text{[Expression 2]}$$

The conversion coefficient h (T) is a function to be acquired prior to the measurement.

Subsequently, a temperature when the laser power is 0 W, that is, a temperature $T_0$ immediately before the laser oscillation is turned ON is input.

Then, a temperature $T_1$ of the laser power is input.

The conversion means 21 obtains a laser power value through the following expression.

$$\text{"laser power"}=h(T_0)*(T_1-T_0) \qquad \text{[Expression 3]}$$

In this example, the laser power can be measured through Expression 3 described above, without depending on the heat capacity of the laser receiving body. However, if the heat capacity is significant, there is an occurrence of a time lag of the temperature T with respect to the laser power change. There is a need to measure the temperature T by understanding the time lag.

The measurement of the laser power using the laser power meter 20 can be realized in a sufficiently simple manner at low cost. However, since the coolant is flowing at all times, the range of a temperature increase becomes small, and thus, there may be a case where sufficient measurement accuracy cannot be obtained. For example, there is a temperature increase by 100 when the laser power is 2 kW and the coolant is 3 L/min. When the temperature is measured at an accuracy of 0.5 C, the laser power value has a measurement accuracy of approximately 5%.

Subsequently, regarding the laser power meter and the laser power measurement method which can enhance the temperature increase range in order to further improve the measurement accuracy, descriptions will be given with reference to the flow charts in FIGS. 1 and 2, and a time chart in FIG. 3.

Firstly, as an initial state, upon a command of the measurement control means 30, the laser oscillation control means 32 causes the laser oscillation to pause, and the flow blocking means 31 allows the coolant to flow (the turned ON state of the coolant in FIG. 3(a)).

Figure 2:
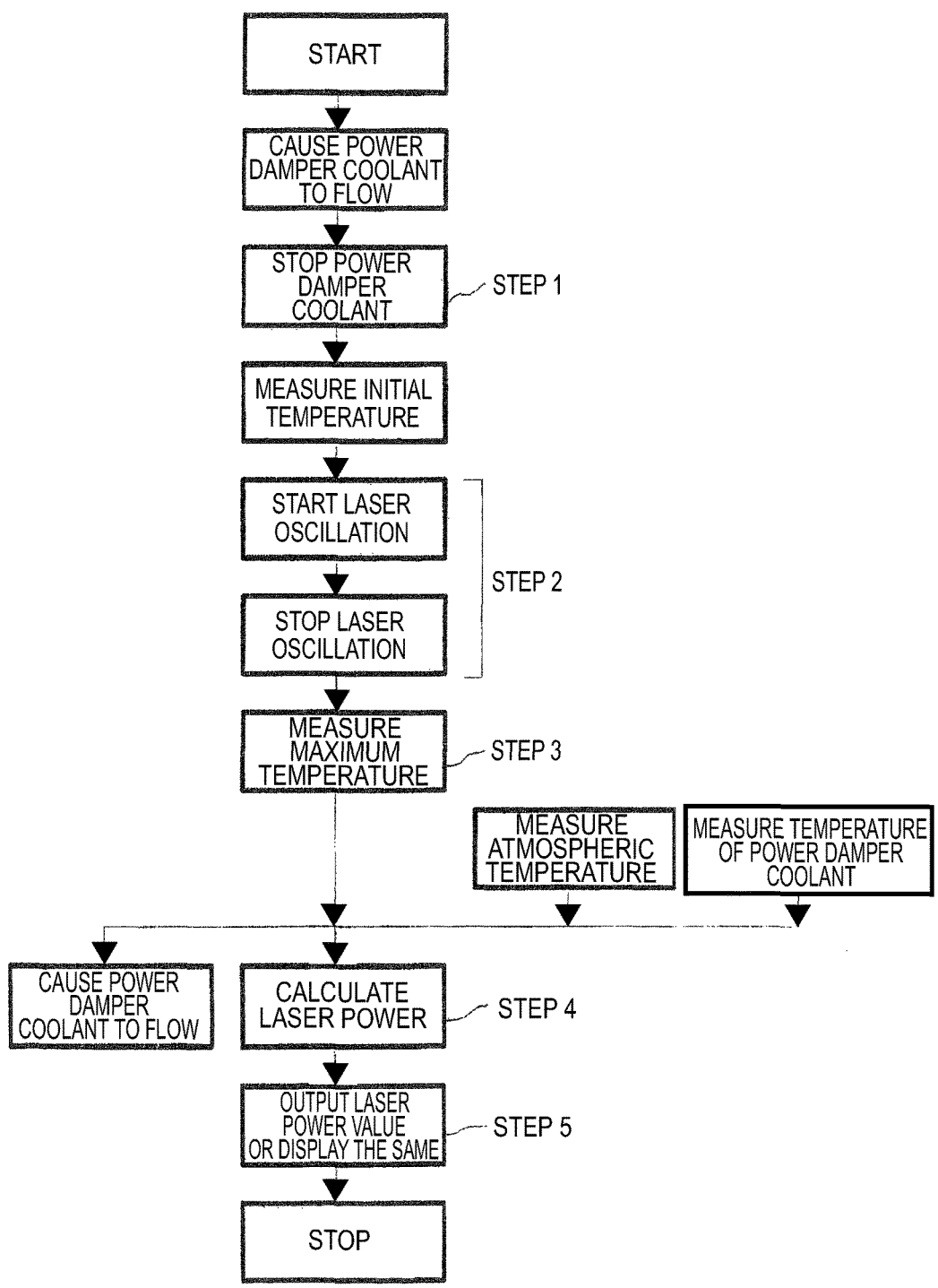
FIG. 2 is a flow chart illustrating a laser power measurement method of the invention.

In Step 1 of FIG. 2, at the stage where the temperature of the laser receiving body 1 becomes equivalent to the temperature of the coolant, upon a command of the measurement control means 30, the flow blocking means 31 stops the coolant (the turned OFF state of the coolant in FIG. 3(a)). At this time, the initial temperature $T_0$ is measured by the temperature measurement means 5a or 5b. The initial temperature $T_0$ of the laser receiving body 1 is the temperature of the coolant as well.

In Step 2 of FIG. 2, upon a command of the measurement control means 30, the laser oscillation control means 32 causes the laser oscillator 10 to oscillate for a certain time (from the oscillation ON state to oscillation OFF state in FIG. 3(b)). The oscillation time is accurately measured by the laser oscillation time measurement means 22, and input to the conversion means 21.

In Step 3 of FIG. 2, the maximum temperature $T_1$ of the laser receiving body 1 which is realized after the oscillation stops is measured by the temperature measurement means 5a and 5b (the reference sign a in FIG. 3(c) is the temperature of the temperature measurement means 5a, and the reference sign b is the temperature of the temperature measurement means 5b). A delay from when the oscillation stops until the temperature thereof reaches the maximum temperature is the time lag due to the heat capacity and the heat transmission of the laser receiving body 1. Accordingly, 5b closer to the irradiation position reaches the maximum temperature faster than 5a in the vicinity of the heat insulation member 4 which is a terminal end portion of the heat transmission, and the increase range thereof becomes significant.

In Step 4 of FIG. 2, the conversion means 21, using a temperature increase range ($T_1-T_0$), a heat capacitance Cq of the laser receiving body 1, and laser oscillation time t, calculates an average power value during the laser irradiation, through the following expression.

average power value=$Cq(T_1-T_0)/t$

In Step 5 of FIG. 2, the laser power output and display means 75 outputs and displays the laser power value. For example, when an aluminum laser receiving body of 1 kg is irradiated with laser power of 2 kW for 20 seconds, since specific heat of aluminum is 0.88 J/g/C, the temperature increase range becomes approximately 45 C, and thus, measurement accuracy thereof is improved 4.5 times for a case of flowing.

The irradiation time in Step 2 is set so as to cause the temperature to be sufficiently low to the extent of not causing thermal stress fracture to the inner surface 1a which is the laser receiving surface, and to cause the temperature to be approximately 90% of the input range specification of the conversion means 21 with respect to the laser power. In the measurement, noise is certainly mixed into a signal. In addition, when performing A/D conversion with the signal to be in the previous stage of calculation, divider widths each of which corresponds to 1 bit in the A/D conversion are present. The noise intensity and the divider widths determine resolution of the measurement. Since the resolution is constant by a general measurement system, when the signal intensity is increased, the measurement accuracy thereof is improved.

Here, a heat insulation effect of stopping the coolant will be described. The heat transmission rate in the case of flowing ranges from 3,000 W/m$_2$/C to 6,000 W/m$_2$/C, but when the coolant is stopped, the heat transmission rate becomes 300 W/m$_2$/C. This is the same operation as the insulation by rubber (the heat transmission rate of 0.3 W/m/C) having a thickness of approximately 1 mm, when the same temperature difference is maintained in the same transmission area. In addition, practically, the temperature of the coolant increases together with a heat absorption quantity, a temperature difference with respect to the laser receiving body becomes small, and thus, the heat absorption quantity decreases. In other words, in the flowing state, the coolant works as a favorable heat absorption surface, and in the stopped state, the coolant becomes a heat insulation surface.

Figure 4A:
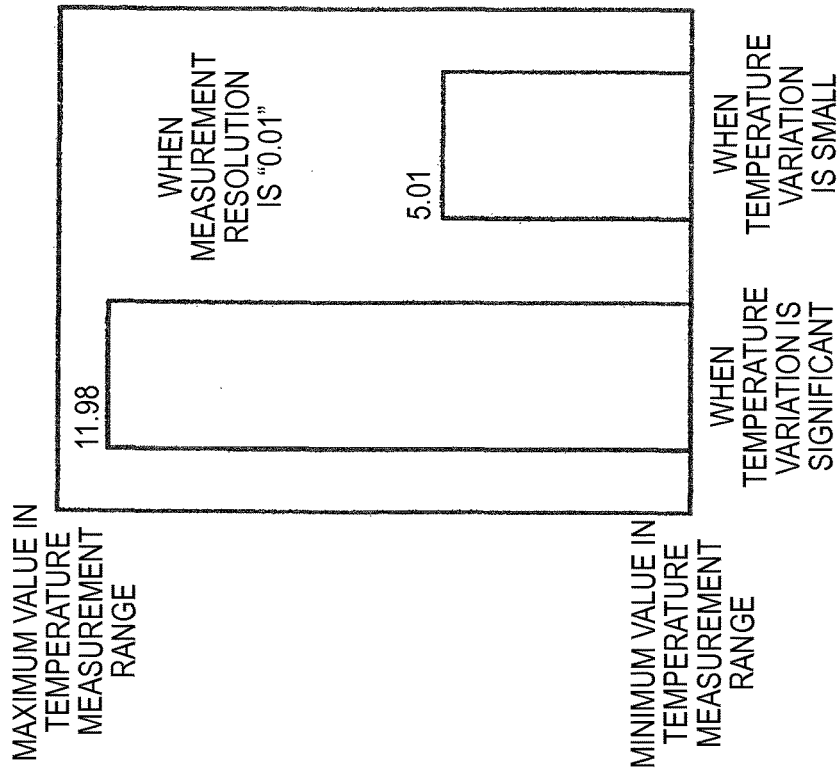
FIGS. 4A and 4B are bar graphs of a temperature variation illustrating a method of improving accuracy of the invention.
Figure 4B:
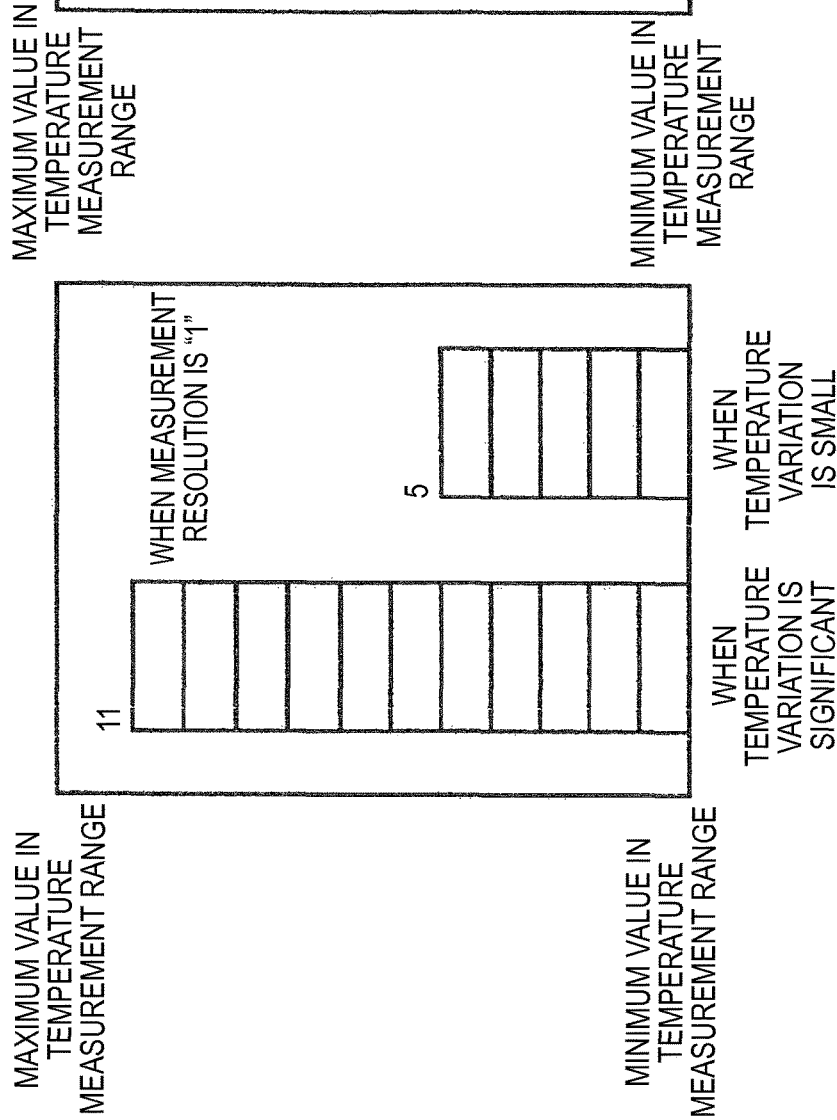

Regarding an improvement of the accuracy, descriptions will be given in detail with reference to FIG. 4. When the measurement resolution is "1", if the signal intensity is "11" and "5", the measurement accuracy of the former case is 9% (=1/11), and the latter case is 20% (=1/5). The case of "11" is measured to be more favorable by approximately twice the other (FIG. 4(a)). When the measurement resolution is favorable, such as "0.01", if the signal intensity is "11.98" and "5.01", the measurement accuracy of the former case is 0.083% (=0.01/11.98), and the latter case is 0.2% (=0.01/5.01). The case of "11.98" which is approximately "11" is measured to be more favorable approximately twice the other (FIG. 4(b)). Even though the resolution is different, if the signal intensity is twice, the measurement accuracy is more favorable by twice the other. In other words, in order to improve the measurement accuracy, it is favorable to increase the signal intensity. However, in this case, the measurement cannot be performed if the signal intensity exceeds the input range of the measurement system. Therefore, when the signal intensity is set to approximately 90% of the input range specification, the measurement system can sufficiently exhibit the performance.

After ending Step 3, in order to recover the temperature of the power damper 6 in the normal time, the flow blocking means 31 stops the blocking and causes the coolant to flow in the channel 2.

In addition, in calculation of Step 4, since the heat transmission from the inner surface 1a to the air is corrected, the measurement value of the atmospheric temperature is input, thereby making it possible to further improve the measurement accuracy.

In this manner, according to the laser power meter and the laser power measurement method of the invention, the temperature increase range can be significantly secured, and thus, the laser power measurement having high measurement accuracy can be realized at low cost.

[Operation of Laser Power Monitoring System]

Subsequently, an operation of a laser power monitoring system will be described with reference to FIG. 1.

In a high-power laser, there is an occurrence of performance degradation in configuration elements such as a power source, an excitation medium, a resonator mirror, and a power monitoring sensor, due to the high power thereof. On account of the performance deterioration, the actually measured power with respect to the set power is degraded. An influence on the laser power due to the performance degradation of each configuration element is characterized by an oscillator. For example, when CO2 laser power is degraded in a short time, it can be determined that laser gas (excitation medium) has run down (decomposition, or recombination of bonding of the component gas). In this case, it is favorable to replace the laser gas. When the power immediately after replacing the laser gas is degraded by the term of several months, it is determined that the reflection rate is degraded due to a stain and the like of the resonator mirror. When the laser power is degraded during only the high power among several stages of power setting, it is considered that the power source is abnormal. In this manner, the history thereof such as daily power changes and each of the power changes immediately after various types of maintenance is compared with the database regarding the maintenance item, thereby allowing selection of the maintenance item.

Hereinafter, a specific operation will be described.

The laser power measurement control means 30 automatically measures the laser power as is described in the flow chart of FIG. 2 during a time zone when the laser oscillator 10 is not oscillated, for example, for several tens of seconds immediately after starting the oscillator, when a laser processing machine transfers a processing program, or when a processing table is driven for checking the operation with laser emitting being turned OFF. The actual measurement value of the laser power is stored in the storage means 81. In this case, the set power value is simultaneously stored as necessary.

The current measurement value of the laser power, the stored measurement values of the previous measurement values and that of the same maintenance are used to calculate the change of the laser power by the calculation means 82. Then, in the maintenance selection means 83, the change value is referred to the database of the maintenance item, thereby selecting the maintenance item. Naturally, it may be determined that there is no need of maintenance. The notification means 84 notifies the determined maintenance item (a necessary maintenance component and the time therefor) to an operator (a user) or a person in charge at the management department of the oscillator. In addition, as necessary, the maintenance component manufacturer is directly notified thereof as well.

According to the system, the item, the component, and the time for maintenance are predictable, and thus, a component-supplying manufacturer can produce and supply the components when needed. Accordingly, production planning can be easily established, and there is no occurrence of surplus stock. In addition, since a user of an oscillator (in most cases, a user of the laser processing machine) can check the maintenance time, an operation plan of the oscillator is established so that the laser oscillator can be effectively used. Since there is no occurrence of a standby for delivery of the maintenance component, a practical operation rate of the oscillator (the laser processing machine) is thereby improved.

The database may be stored inside the maintenance item selection means 83. On the other hand, a database of the oscillator manufacturer or the component-supplying manufacturer may be utilized via the internet. The database of each manufacturer on the internet allows the user to easily collect various types of data (the laser power measurement value, the power setting value, the immediately previous maintenance item, date and time, the actual maintenance item, and the like) through the notification means 84. The number of items of data is massive and up-to-date. Accordingly, it is the most reliable when the database thereof is utilized.

Embodiment 2

The present Embodiment 2 relates to the power damper and the laser power meter having simpler configurations compared to those of Embodiment 1, and descriptions will be given with reference to FIG. 5.

[Power Damper]

Figure 5:
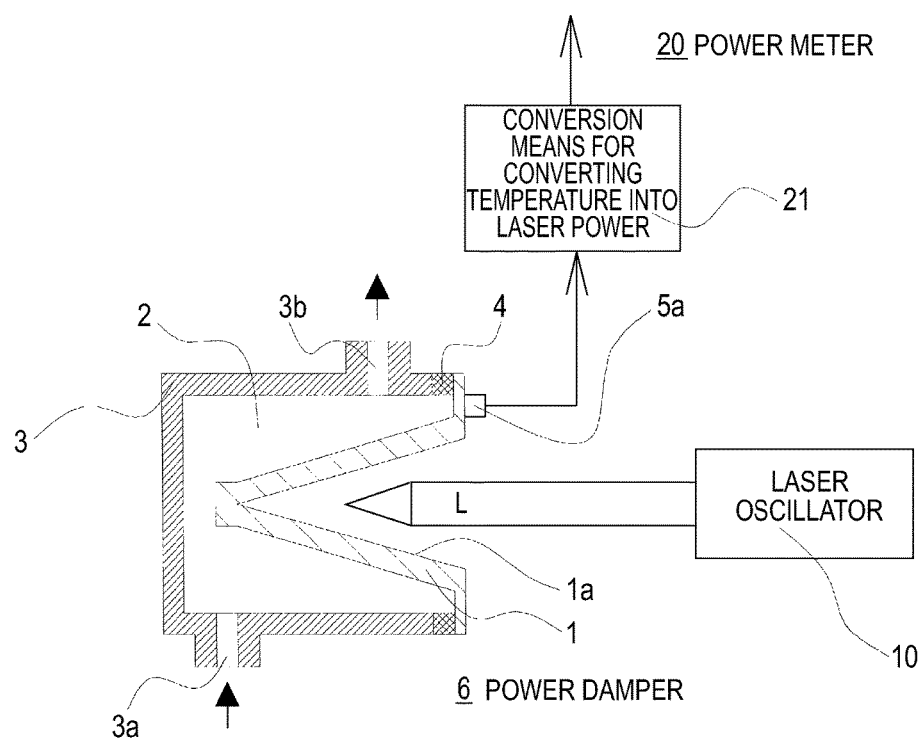
FIG. 5 is a schematic diagram of the power damper according to Embodiment 2 of the invention.

In FIG. 5, in the power damper 6 of the present Embodiment 2, the temperature measurement means 5*b* is omitted from the power damper illustrated in FIG. 1 so as to simplify the configuration. Since the rest of the configuration is the same as the power damper in FIG. 1, the same reference numerals and signs are applied to the same elements as those in FIG. 1, thereby omitting the description thereof. The temperature measurement means 5*a* is attached to the vicinity of the heat insulation member 4 (the position far away from the laser beam irradiation position) of the inner surface 1*a* of the laser receiving body 1. Therefore, even though the temperature increase is slightly slow, there is no problem regarding accuracy, and the wiring of the temperature measurement means 5*a* is easy (there is no need of water resistance and heat resistance).

[Laser Power Meter]

Subsequently, a configuration of the laser power meter will be described.

The laser power meter 20 is realized by attaching the conversion means 21 to the power damper 6. Similar to the calculation in Embodiment 1, the conversion means 21 acquires the laser power value based on the signals (the temperature measurement values) of the temperature measurement means 5*a*, and the heat capacity of the power damper 6 (the laser receiving body 1). The laser power meter adopting a general power damper measures the temperatures of an entrance and an exit of the coolant (two of temperature measurement means in total), and measures a flow rate of the coolant (one of flow rate measurement means), thereby acquiring the laser power value. In other words, three of measurement means in total (sensors) are required.

As is described, in the laser power meter adopting the power damper of the invention, there is the below-mentioned difference in the configuration compared to that of the example in the related art.

Embodiment 2: Heat Insulation Member+One of Temperature Measurement Means

Example in the Related Art: Two of Temperature Measurement Means+One of Flow Rate Measurement Means In other words, in Embodiment 2, the temperature measurement means is only one, having a feature to be able to acquire the laser power value without using an expensive flow rate measurement means.

Hereinbefore, the invention has been described according to Embodiments. However, within the scope of the invention, it is possible to combine each of Embodiments, and each of Embodiments can be appropriately changed or omitted.

REFERENCE SIGNS LIST 1 laser receiving body,
1*a* inner surface of laser receiving body,
1*b* outer surface of laser receiving body,
2 channel,
3 case,
3*a* inflow hole,
3*b* outflow hole,
4 heat insulation member,
5 temperature measurement means,
5*a* temperature measurement means (positioned in the vicinity of connection portion between laser receiving body and case),
5*b* temperature measurement means (positioned on outer surface of laser receiving portion of laser receiving body),
6 power damper,
10 laser oscillator,
20 power meter,
21 conversion means,
22 laser oscillation time measurement means,
30 laser power measurement control means,
31 coolant flow blocking means,
32 laser oscillation control means,
33 coolant temperature measurement means,
34 atmospheric temperature measurement means,
75 laser power output means and display means,
80 laser power monitoring system,
81 laser power storage means,
82 laser power variation calculation means,
83 maintenance item selection means, and
84 maintenance component and maintenance time notification means.

The invention claimed is:

1. A power damper comprising:
a laser receiving body that receives a laser beam from a laser oscillator on an inner surface thereof and converts laser power into heat;
a case that is attached to the laser receiving body so as to surround an outer surface of the laser receiving body and forms a channel of a coolant between the case and the outer surface of the laser receiving body;

an inflow hole and an outflow hole respectively leading to and from the channel provided in the case;
a heat insulation member that thermally isolates the laser receiving body and the case from each other in an attachment portion of the laser receiving body and the case; and
temperature measurement means for measuring a temperature of the laser receiving body,
wherein the temperature measurement means includes a first temperature sensor installed in a vicinity of the attachment portion attached to the case, on an inner surface of the laser receiving body.

2. A laser power measurement method adopting the power damper according to claim 1, comprising:
a first step of blocking circulation of a coolant into the power damper;
a second step of oscillating a laser for a certain period;
a third step of measuring the maximum variation value of an output signal of the temperature measurement means for the laser receiving body;
a fourth step of calculating a laser power value based on the maximum variation value, a heat capacity of the power damper, and laser oscillation time, using conversion means; and
a fifth step of outputting or displaying the laser power value.

3. The laser power measurement method according to claim 2,
wherein the conversion means is configured to have an A/D converter and an arithmetic circuit, and
wherein a laser oscillation period is controlled by laser oscillation control means so as to cause an estimated output value of the temperature measurement means obtained through laser power to be substantially 90% in an input range of the A/D converter.

4. The power damper according to claim 1,
wherein the temperature measurement means includes a second temperature sensor installed on the outer surface of the laser receiving body.

5. The power damper according to claim 1,
wherein the temperature measurement means is a thermocouple, a platinum resistor, or a temperature sensor IC.

6. A laser power meter comprising:
conversion means for converting a signal detected by the temperature measurement means included in the power damper according to claim 1 into laser power.

7. The laser power meter according to claim 6, further comprising:
flow blocking means for stopping a flow of a coolant of the power damper; and
laser oscillation control means for irradiating a laser receiving body with a laser beam for a certain time.

8. The laser power meter according to claim 6,
wherein the conversion means calculates laser power based on an output signal of oscillation time measurement means of a laser oscillator which irradiates the power damper with a laser beam, an output signal of coolant temperature measurement means for the power damper, an output signal of atmospheric temperature measurement means, and an output signal of the temperature measurement means.

9. A laser power monitoring system adopting the power damper according to claim 1, comprising:
control means for automatically measuring laser power while power of the laser oscillator is turned on and during a period when no laser oscillation is necessary;
storage means for laser power;
means for calculating a chronological variation of laser power;
means for selecting a maintenance item of the laser oscillator referring to the variation of laser power;
means for notifying a maintenance component based on the maintenance item; and
means for notifying maintenance time referring to the maintenance item.

* * * * *